(12) United States Patent
Zhang et al.

(10) Patent No.: US 9,106,672 B2
(45) Date of Patent: Aug. 11, 2015

(54) METHOD AND APPARATUS FOR PERFORMING MULTIPLE FORMS OF COMMUNICATIONS IN ONE SESSION

(75) Inventors: Guohua Zhang, Beijing (CN); Jilei Tian, Beijing (CN); Xia Wang, Beijing (CN); Wei Wang, Beijing (CN); Feng Ding, Beijing (CN); Yuezhong Tang, Beijing (CN); Xinxing Yang, Beijing (CN); Ari Aarnio, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 152 days.

(21) Appl. No.: 13/519,649

(22) PCT Filed: Dec. 31, 2009

(86) PCT No.: PCT/CN2009/076329
§ 371 (c)(1),
(2), (4) Date: Aug. 7, 2012

(87) PCT Pub. No.: WO2011/079456
PCT Pub. Date: Jul. 7, 2011

(65) Prior Publication Data
US 2013/0198397 A1 Aug. 1, 2013

(51) Int. Cl.
*H04L 29/06* (2006.01)
*H04W 4/00* (2009.01)
(Continued)

(52) U.S. Cl.
CPC ........ *H04L 65/1066* (2013.01); *H04L 65/1089* (2013.01); *H04L 65/4007* (2013.01); *H04W 4/001* (2013.01); *H04W 4/02* (2013.01); *H04W 4/18* (2013.01)

(58) Field of Classification Search
USPC .......................................... 709/228
See application file for complete search history.

(56) References Cited

U.S. PATENT DOCUMENTS

2008/0147407 A1 6/2008 Da Palma et al.
2008/0232248 A1* 9/2008 Barave et al. ............... 370/230
(Continued)

FOREIGN PATENT DOCUMENTS

CN 1545818 A 11/2004
CN 101084686 A 12/2007
(Continued)

OTHER PUBLICATIONS

"SMS to Voice—Voice SMS—Text to Speech", SMS Messaging, Retrieved on Jun. 25, 2013, Webpage available at: www.sms-messaging.com/sms_voice.htm.
(Continued)

*Primary Examiner* — Tu Nguyen
(74) *Attorney, Agent, or Firm* — Ditthavong & Steiner, P.C.

(57) ABSTRACT

An approach is provided for performing multiple and hybrid forms of communication in the same communication session. A communication manager receives a to establish a communication session using a first form of communication, wherein the communication session supports multiple and simultaneous forms of communication. Next, the communication manager selects a second form of communication to conduct the communication session. Then, the communication manager transcodes the second form of communication to the first form of communication. The different forms can be converted to facilitate and enrich the communication capability, according to an embodiment of the invention.

20 Claims, 9 Drawing Sheets

(51) Int. Cl.
*H04W 4/02* (2009.01)
*H04W 4/18* (2009.01)

(56) References Cited

U.S. PATENT DOCUMENTS

2009/0043502 A1* 2/2009 Shaffer et al. .................. 701/213
2009/0083279 A1* 3/2009 Hasek ............................. 707/10

FOREIGN PATENT DOCUMENTS

| CN | 101207655 A | 6/2008 |
|---|---|---|
| WO | 03/056859 A2 | 7/2003 |
| WO | 2006/020977 A1 | 2/2006 |

OTHER PUBLICATIONS

"Free text to speech or text to voice", Retrieved on Jul. 4, 2013, Webpage available at: http://freevcalls.blogspot.com/2008/09/free-text-to-speech-or-text-to-voice.html.

International Search Report and Written Opinion received for corresponding International Patent Application No. PCT/CN2009/076329, dated Oct. 8, 2010, 10 pages.

Chinese Office Action for related Chinese Application No. 200980163231.1, dated Apr. 30, 2014, with English-language summary, 10 pages.

* cited by examiner

US 9,106,672 B2

METHOD AND APPARATUS FOR PERFORMING MULTIPLE FORMS OF COMMUNICATIONS IN ONE SESSION

RELATED APPLICATION

This application was originally filed as PCT Application No. PCT/CN2009/076329 filed Dec.31, 2009.

BACKGROUND

Modern communication technology enables users to communicate in various forms including telephone, Short Message Service (SMS), Multimedia Messaging Service (MMS), instant messaging, e-mail, and the like. However, within a conventional communication session, a user is typically limited to communicating in the form that was used to initiate the session. For example, if the user receives a telephone call, the user generally has to respond by voice over the telephone call. As a result, if the user receives a communication in one form and the user's context (e.g., the user is in a meeting or other location where a voice conversation would be inappropriate or be disturbing to others) does not allow the user to conduct the communication session, the user usually would have to reject or miss the communication. In other words, the user typically does not have the option to use or switch between multiple forms of communications (e.g., including communications in a hybrid form that transcodes one form to another) independently of the form of communication used to initiate the session. Accordingly, service providers and device manufacturers face significant technical challenges to integrating multiple hybrid forms of communications in a single context-aware communication session (e.g., a communication session that can alter the form the communication for one or more of the communicating parties depending on contextual information). Overcoming such technical challenges can enhance the user experience and offer greater flexibility and convenience when conducting communication sessions.

SOME EXAMPLE EMBODIMENTS

Therefore, there is a need for an approach for performing multiple forms of communications in the same communication session.

According to one embodiment, a method comprises receiving a request to establish a communication session using a first form of communication, wherein the communication session supports multiple and simultaneous forms of communication. The method also comprises selecting a second form of communication to conduct the communication session. The method further comprises transcoding the second form of communication to the first form of communication.

According to another embodiment, an apparatus comprising at least one processor, and at least one memory including computer program code, the at least one memory and the computer program code configured to, with the at least one processor, cause, at least in part, the apparatus to receive a request to establish a communication session using a first form of communication, wherein the communication session supports multiple and simultaneous forms of communication. The apparatus is also caused to select a second form of communication to conduct the communication session. The apparatus is further caused to transcode the second form of communication to the first form of communication.

According to another embodiment, a computer-readable storage medium carrying one or more sequences of one or more instructions which, when executed by one or more processors, cause, at least in part, an apparatus to receive a request to establish a communication session using a first form of communication, wherein the communication session supports multiple and simultaneous forms of communication. The apparatus is also caused to select a second form of communication to conduct the communication session. The apparatus is further caused to transcode the second form of communication to the first form of communication.

According to another embodiment, an apparatus comprises means for receiving a request to establish a communication session using a first form of communication, wherein the communication session supports multiple and simultaneous forms of communication. The apparatus also comprises means for selecting a second form of communication to conduct the communication session. The apparatus further comprises means for transcoding the second form of communication to the first form of communication.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for performing multiple forms of communications in the same communication session are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
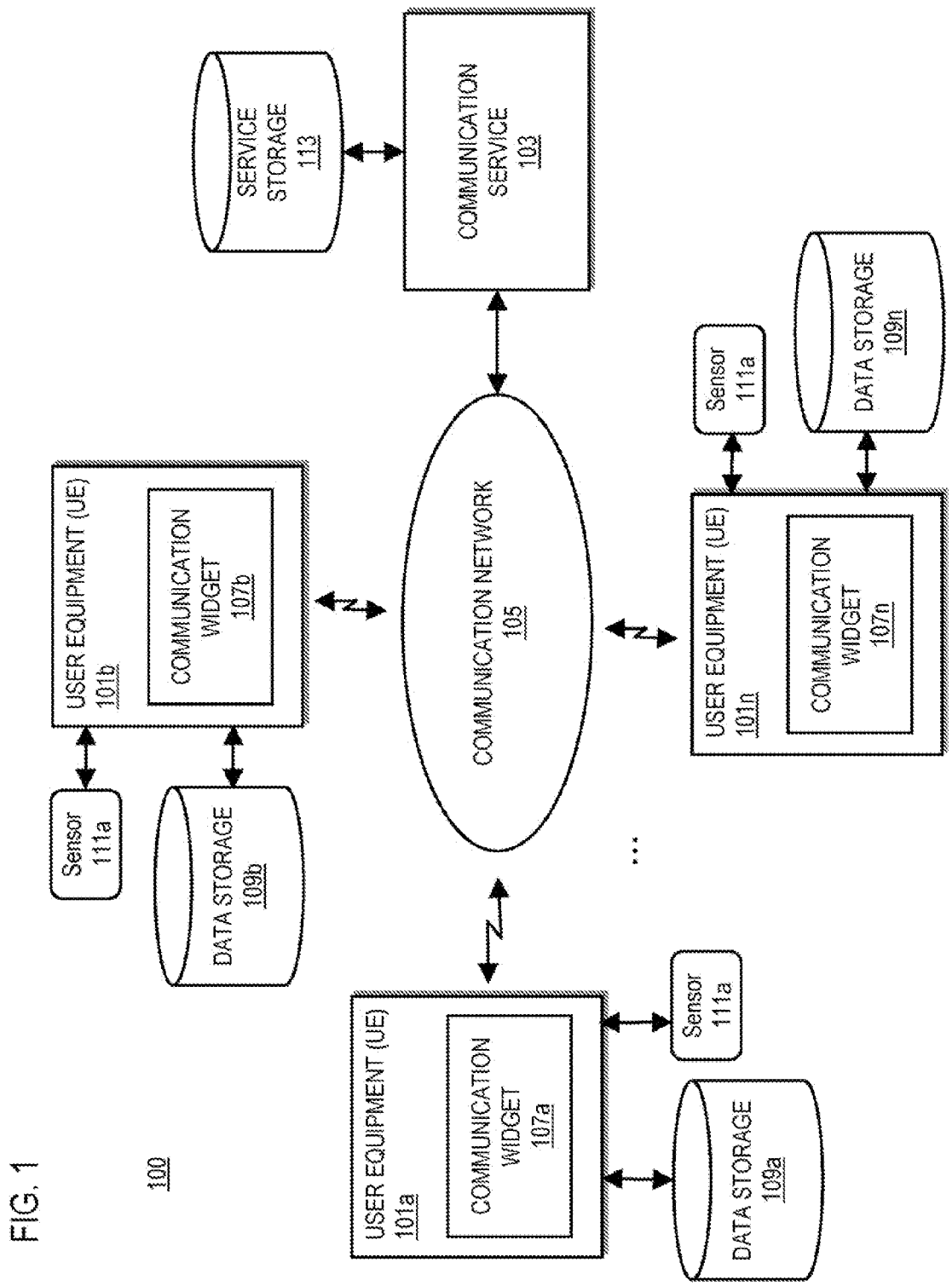
FIG. 1 is a diagram of a system capable of performing multiple forms of communication in the same communication session, according to one embodiment.

FIG. 1 is a diagram of a system capable of performing multiple forms of communication in the same communication session, according to one embodiment. As discussed previously, advancements in communication technology have result in the availability of many different forms of communications including voice communications (e.g., traditional landline, voice over Internet Protocol, etc.), text messaging (e.g., Short Message Service (SMS), Multimedia Messaging Service (MMS), etc.), e-mail, instant messaging, social networking updates, and the like. Moreover, it is becoming more common for a single device (e.g., a smartphone, mobile device, handset, etc.) to have the capability to support all or some of these types of communications. For example, many modern mobile devices can be used for telephone calls, to send text messages, to send instant messenger messages, and to send e-mails or perform any other Internet-based communications. Each form of communication has distinct advantages and disadvantages. For example, a voice call (e.g., telephone call) is beneficial in that it provides real-time voice-based conversation between parties such that the parties can talk to one another as if they are talking in person. However, in a telephone call, it can be difficult to convey certain information (e.g., account numbers, complex spellings, addresses, maps, drawings, etc.) that is better expressed using written or visual communications. For example, a text message is beneficial in that a user can communicate in a written form, which may be saved as a record or used to convey a correct spelling. Text messages also enable the user to send or receive data, files or media attached to the text message. Further, communication via text message may be beneficial in an environment that makes it difficult for a user to talk on the phone. However, the text message does not create a real-time voice communication like the telephone conversation. Because each form of communication may provide different advantage and disadvantages, one user may prefer one form of communication while the other may prefer another form of communication, especially when two users are communicating from two different locations. In addition, the user may want to use different forms of information depending on what the user wants to convey during the communication session. For example, when a user on a call with a customer service representative, the user can initiate the session as a voice call and then transmit information such as account numbers, order history, etc. to the representative via a text message while still maintaining the voice session. Therefore, there is a need for a method that allows multiple forms of communication during communication between users.

Conventionally, within a single communication session, only one form of communication is used for communication between parties. Therefore, if a user using one form of communication, e.g., telephone, to communicate with the other user wants to communicate to the other user using a different form of communication (e.g. text message), the user typically ends the telephone session in order to be able to start a text message session to send the text message. For many users, the inconvenience of using current methods for switching among different forms using multiple communication sessions (e.g. one session for voice and another session for text) is too burdensome. As a result, most users do not or cannot conduct multiple concurrent but distinct communication sessions to take advantage of the particular strengths of each type of communication. Further, if a user is in a situation where a caller calls the user via telephone and the user is not able to communicate in voice, the conventional method generally does not provide a way to communicate with the caller in voice, without having the user talk on the phone.

To address this problem, a system 100 of FIG. 1 introduces the following capabilities: (1) establishing a communication session with one form of communication (i.e. a first form), (2) selecting a different form of communication (i.e. a second form) in the communication session, and (3) transcoding the second form of communication to the first form of communication to communicate with the device using the first form of communication. More specifically, the system 100 enables one of the UEs 101*a*-101*n* (e.g. UE 101*a*) to establish a communication session with another one of the UEs 101*a*-101*n* (e.g. UE 101*b*), using one of the forms of communication available for multiple and simultaneous forms of communication. Once the communication session is established between the UEs 101*a* and 101*b*, for example, different forms of communication may be used to send and receive communication between the UEs 101*a* and 101*b*, wherein the UE 101*a* uses a first form of communication and the UE 101*b* uses a second form of communication, which is transcoded to the first form of communication to present to the UE 101*a*, creating a hybrid form of communication. Therefore, within the same communication session, multiple forms of communication may be used to communicate between the UEs 101*a* and 101*b*.

In addition, the approach described herein enables seamless switching among various forms of communications by transcoding or converting one form of communication to another without interrupting the communication session. As noted above, a key advantage of this approach is that a user can select the forms or forms of communication to conduct a communication session independently of the forms of communication used by other parties in the communication session, thereby improving the user's communication experience. Therefore, a means for communicating with multiple forms of communication within the same communication session is anticipated.

Further, using these features, a user may manually or automatically select a suitable form or forms of communication to use based on context information such as the user's current activities or environment (e.g., driving, exercising, attending a meeting, etc.) and then conduct a communication session using the selected communication types. In one embodiment, the suitable form of communication as determined using the context information may be a different form of communication than the form of communication used to establish the communication session. More specifically, the system 100 can determine the associated context information of the UEs 101*a* and 101*b* from sensors or user input, wherein the contextual information can be used to identify the user's profile, behavior, activity, environment, social networking status, and the like. In one embodiment, the context information can be communicated as new media attached or associated (e.g., as metadata) with a particular form of communication, thereby making the form of communication context-aware. Then, as one form of communication is transcoded into another form, the associated context in one form can also be transformed and associated with the other form of communication. For example, the contextual information can be described by text written in natural human style language. Then as the associated form of communication is transcoded from to text-based to voice-based communication, the text can be correspondingly converted into, for instance, voice by text-to-speech and vice versa. An advantage of using a context to determine a form of communication is that this feature reduces the steps the user takes to select from among possible forms of communications by automatically presenting or initiating forms of communication most suitable for a given context. Therefore, a means for selecting a form of communication based on the context is also anticipated.

As shown in FIG. 1, the system 100 comprises a user equipment (UEs) 101a-101n having connectivity to the communication service 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.). The UE 101 also includes or is connected to a data storage medium 109 to store data and/or to access the stored data.

The UE 101 may also be connected to a sensor module 111. The sensor module 111 may be used to collect information, which may be stored in the data storage 109 or be used by the UE 101. In one embodiment, the sensor module 111 may include a sound recorder, light sensor, global positioning system (GPS) device, temperature sensor, motion sensor, accelerometer, and/or any other device that can be used to collect information about an environmental condition or context associated with the UE 101.

The UE 101 may include a communication manager 107. In one embodiment, the communication manager 107 is capable of handling various operations related to communication using the UE 101. For example, the communication manager 107 may manage incoming or outgoing communications via the UE 101, and display such communication. More specifically, the communication manager 107 provides options to communicate in multiple forms of communication within a single communication session. The communication manager 107 may also provide visualization (e.g. graphical user interface) to allow a user to control communication over the communication network 105. For example, the communication manager 107 may include an option to initiate a communication session with the UEs 101a-101n using one or more forms of communication. Further, the communication manager 107 may include interfaces (e.g., application programming interfaces (APIs)) that enable the user to communicate with Internet-based websites or to use various communications services (e.g., e-mail, instant messaging, text messaging, etc.) via the communication service 103. In some embodiments, the communication manager 107 may include a user interface (e.g., graphical user interface, audio based user interface, etc.) to access Internet-based communication services, initiate communication sessions, select forms of communications, and/or other related functions. The communication manager 107 may also acquire context data associated with the UE 101 from the sensor module 111 and process the data to provide communication options suitable for a determined context.

The communication service 103 provides various services related to communication to the UEs 101a-101n, such that the UEs 101a-101n can communicate with each other over the communication network. The services provided by the communication service 103 may include a cellular phone service, internet service, data transfer service, etc. In one embodiment, the communication service 103 may also provide content such as music, videos, television services, etc. for use during a communication session. The communication service 103 may be connected to a service storage medium 113 to store or access data. In yet another embodiment, the communication service 103 is also able to perform various computations to support the functions of the communication manager 107, some of which may be performed for the UE 101. For example, the communication service 103 can manage the transcoding or conversion of the different forms of communication in a communication or provide the information or content using during the communication session.

By way of example, the UE 101 and the communication service 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
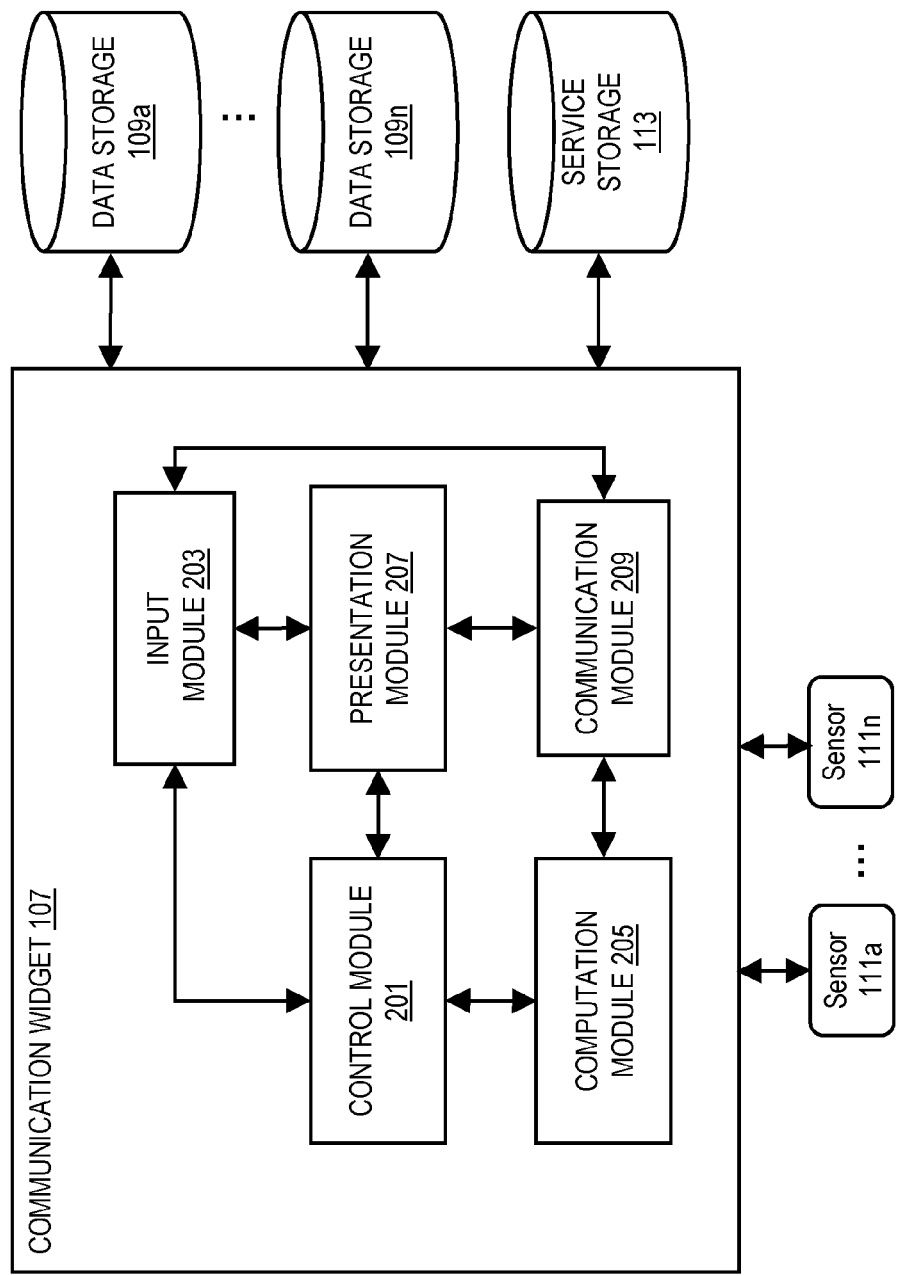
FIG. 2 is a diagram of the components of the communication manager, according to one embodiment.

FIG. 2 is a diagram of the components of communication manager 107, according to one embodiment. By way of example, the communication manager 107 includes one or more components for performing multiple forms of communication in the same communication session. It is contemplated that the functions of these components may be combined in one or more components or performed by other components of equivalent functionality. In this embodiment, the communication manager 107 includes a control module 201, an input module 203, a computation module 205, a presentation module 207 and a communication module 209. The control module 201 oversees tasks, including tasks performed by the control module 201, the input module 203, the computation module 205, the presentation module 207 and the communication module 209. The input module 203 manages and communicates an input into the UE 101, and also communicates information acquired by the sensor modules 111a-111n. The input into the UE 101 may be in various forms including pressing a button on the UE 101, touching a touch screen, scrolling through a dial or a pad, etc. The information acquired by the sensor module 111a-111n may be in various types of data form or an electrical signal that is converted into a data form by the input module 203. The computation module 205 performs computations and estimations (e.g., context determination, recommendation of suitable forms of communications, transcoding, converting, etc.) that are used to manage communication using different forms of communication within the same communication session. The presentation module 207 controls display of a user interface such as graphical user interface, to convey information and to allow user to interact with the UE 101 via the interface. Further, the presentation module 207 interacts with the control module 201, the input module 203 and the communication module 209 to display any necessary information that needs to be conveyed. The communication module 209 manages incoming and outgoing communication in various forms of communication such that different forms of communication may be used within the same communication session. The UE 101 may also be connected to storage media such as the data storage media 109a-109n such that the communication manager 107 can access data or store data in the data storage media 109a-109n. If the data storage media 109a-109n are not local, then they may be accessed via the communication network 105. The UE 101 may also be connected to the service storage 113 via the communication network 105 such that the communication manager 107 may be able to control the data in the service storage medium 113 and store and access data in the service storage medium 113.

Figure 3:
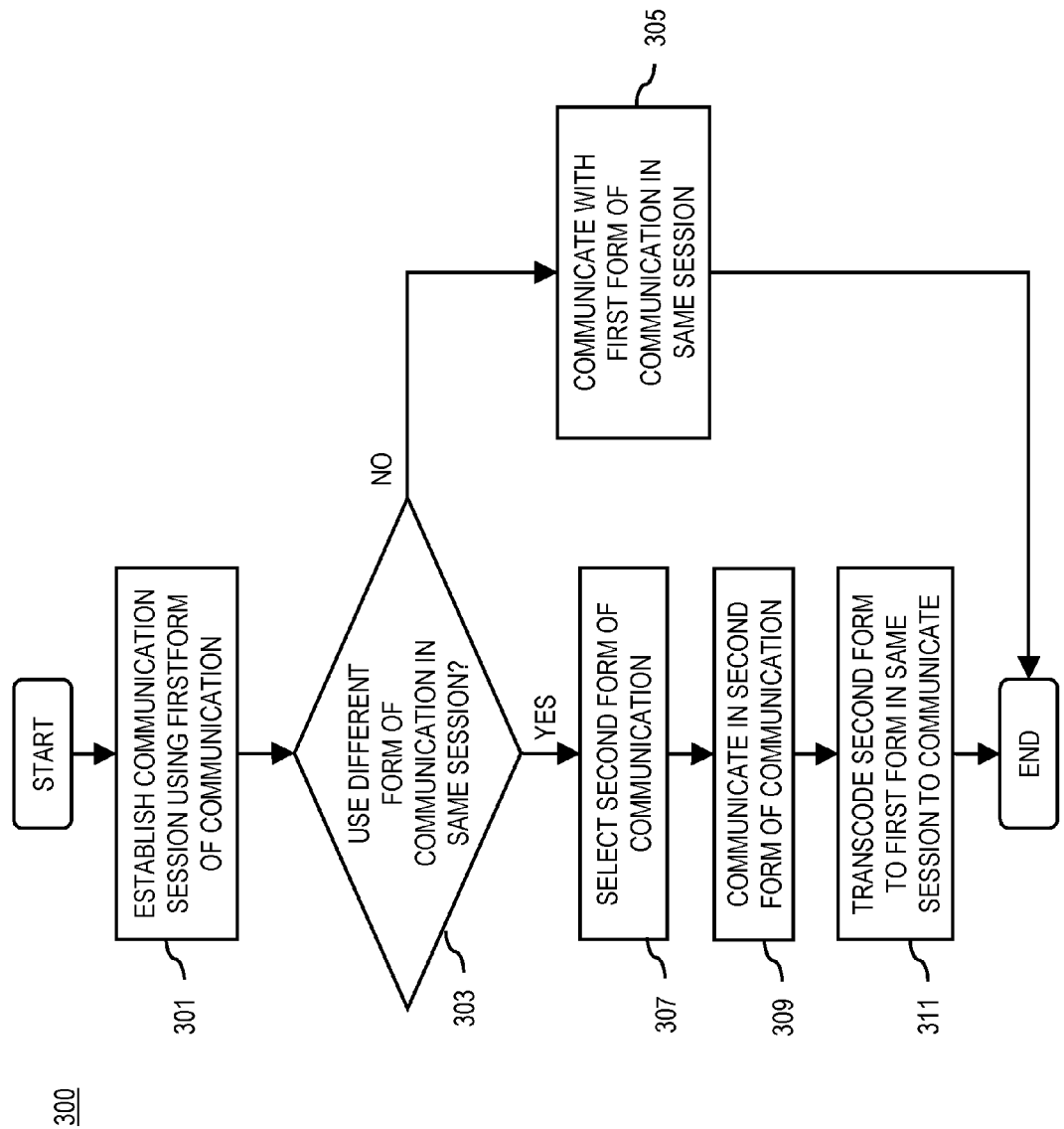
FIG. 3 is a flowchart of a process for performing multiple forms of communication in the same communication session, according to one embodiment.

FIG. 3 is a flowchart of a process for performing multiple forms of communication in the same communication session, according to one embodiment. In one embodiment, the communication manager 107 performs the process 300 and is implemented in, for instance, a chip set including a processor and a memory as shown FIG. 7. In step 301, after receiving a request to establish communication session using a first form of communication, a communication session is established using the first form of communication. For example, a caller may use the UE 101b to send a request to communicate with the UE 101a via the first form of communication (e.g., telephone), by calling the UE 101a. Then, user of the UE 101a may answer the communication request by answering the call from the UE 101b, thereby establishing a communication session between the UE 101b and the UE 101a using the first form of communication (e.g., telephone). In step 303, the communication manager 107 determines whether to use a different form of communication in the same communication session. This determination may depend on a user input on the UE 101 or conditions set on the UE 101. For example, the user may choose an option to use a different form of communication in the same communication session by choosing to use a text message to communicate with the caller who used a telephone to establish a communication session. In another example, if a certain condition is satisfied, the UE 101 may automatically choose to communicate in a different form of communication in the same communication session. The condition may depend on preconfigured user settings, such as presetting to respond to a phone call in a text message during a meeting, for example. Further, user settings may be configured such that certain categories of callers or callers with certain addresses or phone numbers will be responded in a specific form of communication. For example, during a meeting, if a caller who belongs to a "friend" category calls on the phone during the meeting, a text message may be automatically chosen as a form of communication. In another example, if an unknown number or a number that appears to be a telemarketer's number, an automatic text message may be generated and be chosen as a form of communication, in order to keep the conversation short. However, in another example, if a caller who belongs to a "boss" category calls on the phone during a meeting at work, then regular telephone may be chosen as a form of communication.

If the communication manager 107 does not determine that a different form of communication in the same communication will be used, then communication may be performed with the same form of communication in the same session, as shown in step 305. Thus, for example, if the communication via telephone is established and the communication manager 107 does not determine that a different form of communication than a telephone will be used in the same communication, then the user of the UE 101 continues communication via telephone. On the contrary, if the communication manager 107 determines that a different form of communication will be used in the same session, a second form of communication is selected, as shown in step 307, and the communication is performed using the second form of communication in the same communication session, as shown in step 309. Then, the second form of communication is transcoded to the first form of communication, creating a hybrid form of communication, as shown in step 311. In this way, the caller who communicates in the first form of communication will receive responses from the user in the first form of communication, even though the user communicates in the second form of communication.

Communicating via a different form of communication in the same session may be performed in many different ways. In the example where the communication is established via telephone, the user of the UE 101 may choose to select a text message to send a text message within the same communication session. Then, according to this invention, a caller may communicate by speaking on the phone, and the user of the UE 101 may communicate by sending text messages to the caller, with the same communication session. Then, the communication manager 107 converts the user's text messages using, for instance, a text-to-speech engine to voice and then plays the converted voice to the caller, so that caller can still carry on the communication session as if the user were actually talking. By way of example, this feature may be useful in a setting where the user may be able to hear the caller but cannot speak to the caller. For example, if the user is in a meeting or another location where the user can hear the caller's voice via a headset, but cannot speak on the phone, the user can still carry a conversation with the caller by communicating via text messages while the caller communicates via telephone, within the same communication session. In addition, the text may be sent along with the voice to the caller so that the caller using voice communications receives responses from the user as text messages as well as the voice corresponding to the text messages. In another example, another text message option may be available to allow a user to use a template of text messages. In a template, a user may fill in blank portions of the template to form a complete message, and then send this complete message as a text message. The blank portions may represent time, location name, a person's name, meeting name, title of an event, etc. An example of a template may be "I am at a <event name> in <location name>," wherein the "event name" and the "location name" may be filled to complete the message. In this way, the user can quickly construct a text message so that the caller may receive a response with minimum delay.

This process is advantageous in that this process allows communicating in different forms of communication within the same communication session and thus can take advantages of different forms of communication within the same communication session. The communication manager 107 is a means for achieving these advantages.

Figure 4:
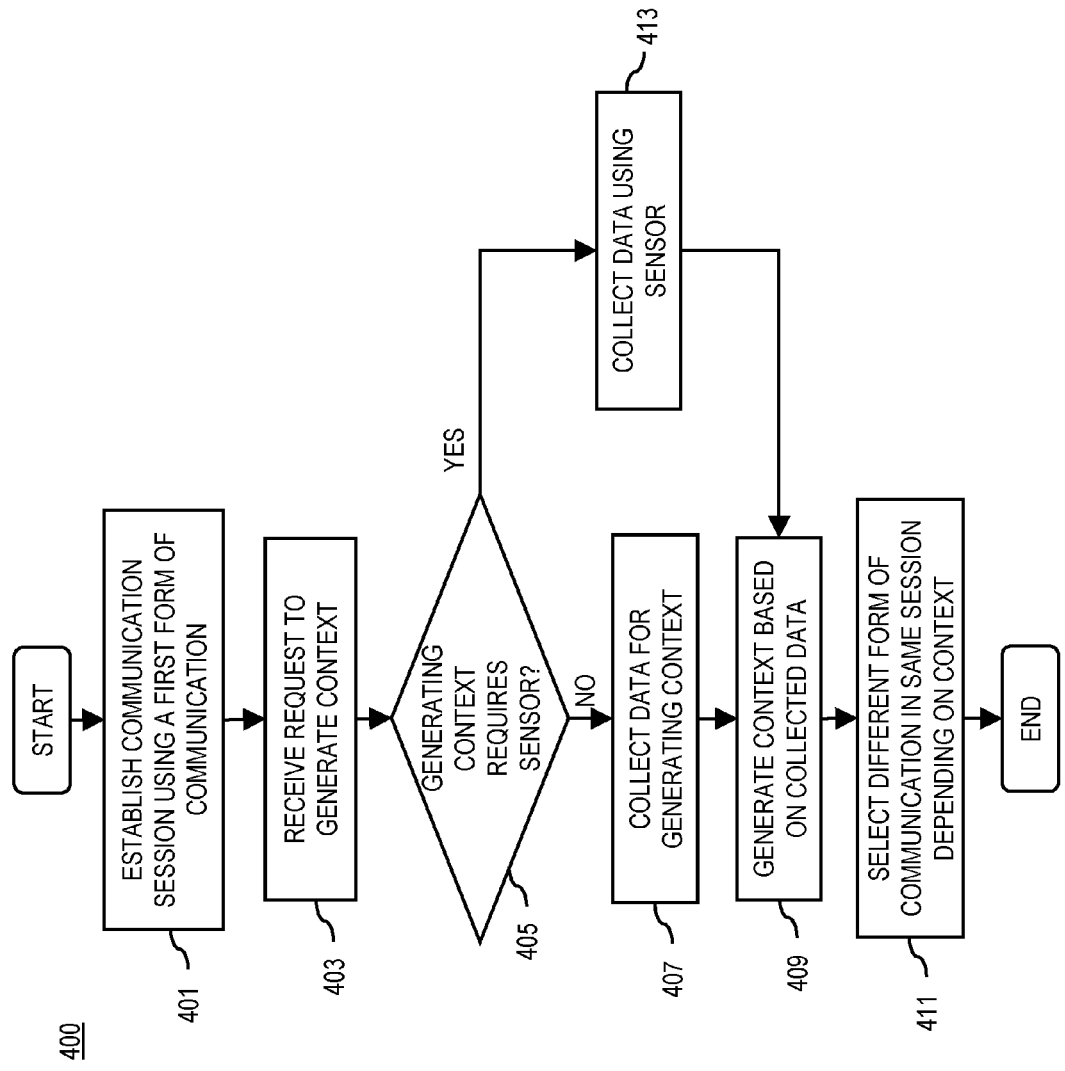
FIG. 4 is a flowchart of a process for generating a context, according to one embodiment.

FIG. 4 is a flowchart of a process for generating a context, according to one embodiment. In one embodiment, the communication manager 107 performs the process 400 and is implemented in, for instance, a chip set including a processor and a memory as shown FIG. 7. In step 401, a communication session is established using a first form of communication. Then, while determining whether to use a different form of communication, a request may be made to generate a context, as shown in step 403. Then, the communication manager 107 determines whether generating context requires collecting data using a sensor (e.g., contained within the sensor module 111), as shown in step 405. If generating the context does not require a use of the sensor, then data is collected for generating the context without using the sensor, as shown in step 407. If generating the context requires a use of the sensor, then the data is collected using the sensor, as shown in step 413. The sensor may include any device capable of acquiring various types of information, including sound, noise level, speed, lighting, image, interruption, etc. Put it simply, the communication manager 107 can generate the context based on the user's context information such as who the user is, what the user is doing, and with whom and in what situation. The sensor may also include a microphone to allow recording of sound, a camera/camcorder and a global positioning system (GPS) device, cell-ID, accelerometer, WiFi, and the like.

Once the data is collected, the communication manager 107 analyzes the context data (e.g., recognizing background noises from sound samples, determining heading and speed from a GPS, cell-ID sensor, identifying the activity from accelerometer, accessing a calendar function, etc.) to determine and generate a context, as shown in step 409. In addition, the context source can also come from external sensors such as in a smart room, and from services by querying for temperature, real time traffic information, etc. The context may be generated automatically or manually by a user's request. The context may also be set such that the context is valid during a predetermined time period. For example, if the context is a meeting running from 1:00 PM to 2:00 PM, the context for the meeting will be set during this time period such that appropriate form of communication will be used to respond to a caller. This meeting time may be extracted from a user's schedule application software in the UE 101 or on an Internet website that the user uses to store his or her schedule.

Further, the context may be generated according to user preferences or settings. For example, the user preferences may want to generate a detailed context or simple context. Further, the user may configure the setting such that the user may choose a type of context to send. The generated context also includes what form of communication to use for sending the context. In step 411, a different form of communication is selected in the same session depending on the context. Then the response is generated in the different form of communication and transcoded to the first form of communication, as similarly explained in step 311 of FIG. 3. Further, some information describing the context may be transcoded to the first form of communication while other information may not be transcoded. For example, a user may configure a setting of the UE 101 such that, when the user receives a telephone call during a meeting, a message stating that the user is in the meeting may be transcoded from a text-based form (e.g., a text message) to voice for transmission to the caller over the telephone. At the same time, information regarding details of the meeting (e.g., meeting place, time, attendees, etc.) may be sent as a text message rather than being transcoded to voice. In this way, the communication manager 107 may advantageously use the most effective form of communication to transfer different responses (e.g., voice for a general response and text for informative details).

In one embodiment, the context may be configured in a variety ways depending on the available sensors and other related information. For example, if a caller establishes a telephone call via voice with a user of the UE 101, and asks for a location of the user holding the UE 101, the user may choose an option to generate location information in text or data and send it back to the caller. The location information may be generated with data gathered from a location sensor such as a GPS device along with other data that may be available about the location (e.g. maps, restaurant information on the Internet, etc.). In another example, when a speed sensor such as an accelerometer or a GPS device is used, the context may be generated based on the speed. The type of context may include, walking, running, driving, flying, etc. depending on how fast the UE 101 with the sensor module 111 is moving. Then, this context may be sent to the caller either automatically or by a user pressing an option to send. Further, various other sensors such as a touch sensor and/or a proximity sensor may be used to approximate actions by the user of the UE 101. For example, if the user is frequently touching the touch sensor on a screen of the UE 101, the communication manager 107 may infer a context that the user is actively using the UE 101 to perform a task. In another example, if a proximity sensor is located on the UE 101, the proximity sensor may detect how close the user is to the UE 101, and thus approximate the user's location with respect to the UE 101.

In addition, a sound sensing device such as microphone may be used as a sensor to record sound surrounding the UE 101, in order to collect data regarding the context. For example, if the user of the UE 101 is at a concert or a loud construction site, the sound recording device may sense the noise or sound pattern to determine the context of the surroundings. In this case, because it is difficult to talk on the phone in an area with loud noise, the context gathered from the sound sensing device may direct the user of the UE 101 to respond to a caller's telephone call in a text message. Further, the sound sensing device may be useful in speech recognition in that if the user of the UE 101 tries to talk to a caller who cannot hear the user due to the caller's disability or an environmental condition (e.g., a noisy environment), the sound sensing device along with a speech recognition technology implemented in the UE 101 may recognize the user's speech and send the caller's speech in a text format to the user of the UE 101, while both the caller and the user attempt to communicate in voice over the telephone within the same communication session. This feature may also be used in a translation service, where a caller only understands Finnish and the user of the UE 101 only knows how to speak English. The UE 101 would recognize the user's speech and translate the user's speech into Finnish. Then, the translation in Finnish may be sent to the caller in a text message and/or via Text-to-Speech (TTS) within the same communication session. In this case, the speech recognition and/or translation may be performed in the UE 101 or in the communication service 103.

Further, an option may be available such that when an option is selected, context about the current situation and/or environment surrounding the user of the UE 101 may be sent in various forms of communication. For example, in an emergency situation, a user call another user via telephone, and when the other user answers the telephone, select an emergency option which may collect various information such as the location, directions to reach the location, sound and/or video clips of the surrounding, etc. and send such information in a text message, a media message and etc. within the same communication session, wherein all or a part of the messages are transcoded to voice. In this case, various sensors such as a GPS device, a sound recording device, a video recording device, and etc., may be used to collect information that may be useful to convey the emergency situation.

This process advantageously allows selecting proper forms of communication depending on the context of the circumstances or surrounding environment, wherein the context may depend on information from a sensor. Therefore, multiple forms of communication may be used within the same session depending on the context, in order to provide optimized user experience in communication. The communication manager 107 is a means for achieving these advantages.

Figure 5B:
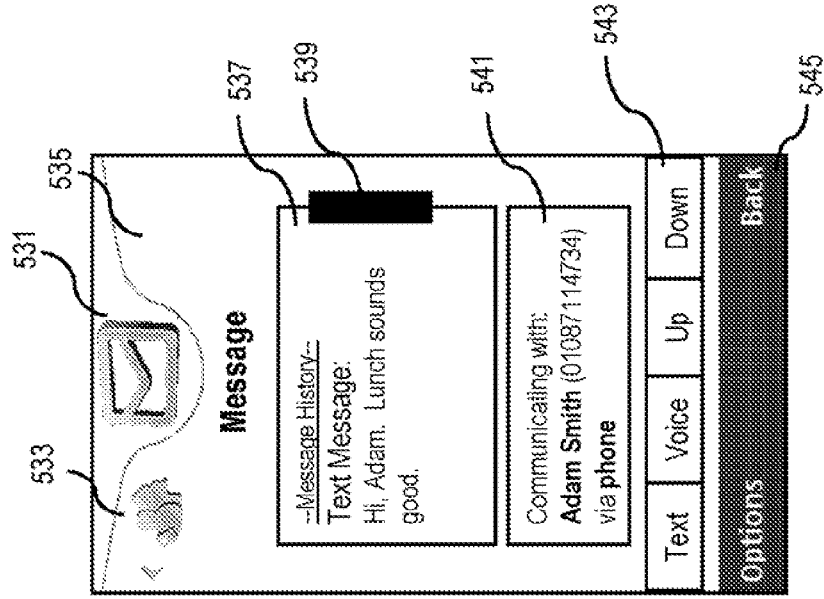
FIGS. 5A-5D are diagrams of user interfaces utilized in the processes of FIG. 3, according to various embodiments.
Figure 5A:
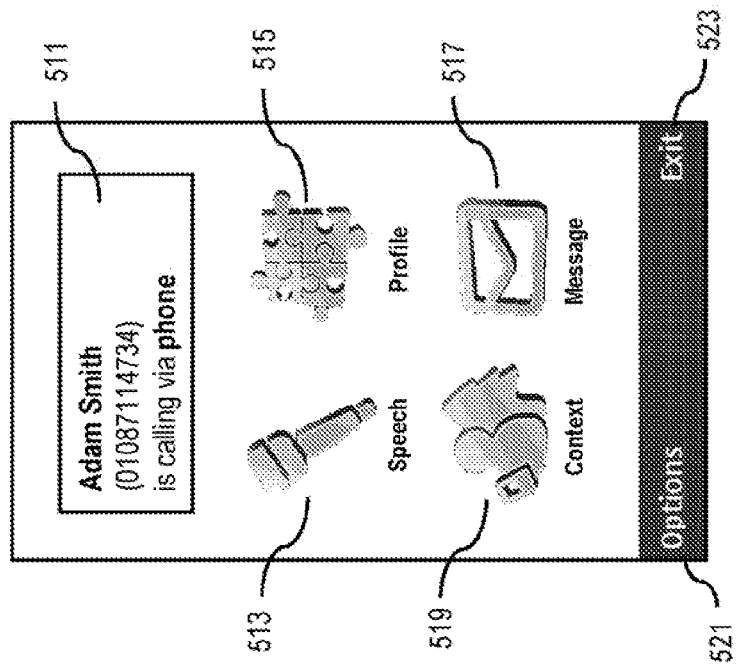

FIGS. 5A-5D are diagrams of user interfaces utilized in the processes of FIG. 3, according to various embodiments. FIG. 5A shows a menu option in the UE 101 displaying options that a user of the UE 101 can use to communicate. In FIG. 5A, when an incoming communication (i.e., telephone call) is received at the UE 101, user interface element 511 shows details of the incoming communication such as a name and a phone number of the caller (i.e., Adam Smith) as well as the form of the communication (i.e., phone) that the caller is using to establish the communication session. FIG. 5A also shows that the UE 101 displays four options to establish the communication session. If the speech option 513 is selected, then the phone call is answered via a phone, which is the same form of communication as the form of communication that the caller uses to establish the communication session. If the profile option 515 is selected, information regarding the UE 101's user profile may be sent to the caller via a set form or forms of communication. The information about the user profile may include the user's status, the location of the user or any other information conveying user's profile. Thus, the user's status and the location of the user may be sent to the caller via voice, a text messaging or media messaging. Additionally, audio or video clips of the current environment may be collected and be sent to the caller when the profile option 515 is selected. The transmission of the user profile information to the caller may be performed within the same communication session established by the caller's phone call. Then, the caller may continue to talk on the phone before, during or after the profile information is transmitted. If the message option 517 is selected, the user of UE 101 may send a text message or a media message to the caller. The context option 519 is selected when a user of UE 101 wants to send the context of the user's activity or state. The user interface also may have other "Options" button 521 to show any other options or customizable settings, and also may have an "Exit" button 521 to ignore the incoming communication from the caller or to exit to another menu in the UE 101.

In another embodiment, instead of selecting the options 513, 515, 519 and 517, at least one of the icons representing these options 513, 515, 519 and 517 maybe dragged and dropped in the user interface element 511 showing the incoming communication, e.g. an indication pop-up of a receiving call function. Then, the option that is dragged and dropped in the user interface element 511 is selected as a form of communication to respond to the caller. For example, if the envelope-shaped icon representing the message option 517 is dragged and dropped in the user interface element 511, then the message interface 530 shown in FIG. 5B is displayed. Further, the icon for the context option 519 may change in shape depending on the type of the context. For example, if the icon for the context option 519 may be changed in a shape of a car if the context is that the user is driving, and the icon for the context option 519 may be changed in a shape of a document if the context is that the user is at work. Further, if the icon for the context option 519 is dragged and dropped in the user interface element 511, a corresponding form of communication for the context is selected. For example, if the selected form of communication for the context of the user driving a car is in a text message format, then a text message window may be displayed when the user drags and drops the icon for the context option 519 in the user interface element 511.

FIG. 5B shows a message interface 530 that is displayed when the message option 517 is selected. As shown by the selected message option 531, a graphical icon representing the message option is displayed. User interface element 533 shows the context option in a smaller graphical icon as another option to which the user can switch by selecting the left arrow. User interface element 533 shows a blank space because there is no option available to the right of the selected message option 531. The message interface has a text message window 537 displaying a text message that a user of the UE 101 enters. The text message window 537 may also have an option to display a message history. The text message window 537 also has a scroll bar 539 to scroll up or down the text message or the message history, if the content of the text message of the message history is too large to display in the text message window 537. A communication window 541 displays the communication status. In the example shown in FIG. 5B, the communication window 541 displays that the user of the UE 101 is communicating with the caller (i.e., Adam Smith) via telephone. Thus, while the caller communicates with the user of the UE 101 using one form of communication (i.e., phone), the user may communicate with the caller with a text message in the same communication session. User interface element 543 shows various options that the user can choose. Via user interface element 543, a user may choose to send the text message via "Text" or "Voice." If the user chooses to send via "Text" on user interface element 543, the text message is sent via a messaging service such as SMS or MMS. If the user chooses to send via "Voice" on user interface element 543, the text is transcoded into voice using a method such as Text-to-Speech (TTS), and the converted voice is sent. User interface element 543 also has "Up" and "Down" options that allow the user to scroll up and down the text message or the message history. The message interface 530 also has a "Back" button to go back to an interface window prior to the message interface 530.

Figure 5C:
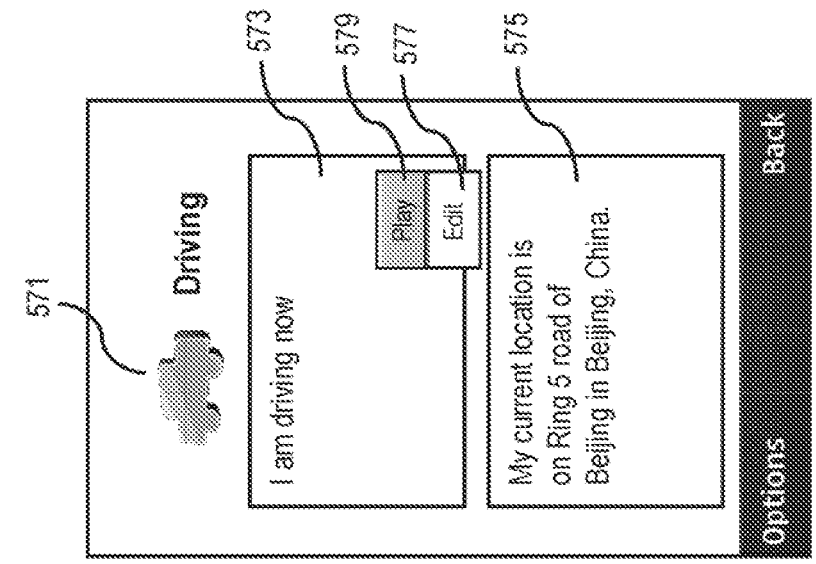

FIG. 5C shows a context interface 550 that is displayed when the context option 519 is selected. User interface element 551 shows a graphical icon representing that the context option is displayed. User interface element 553 shows the profile option in a smaller graphical icon to which the user can switch by selecting the left arrow. Further, User interface element 553 shows the message option in a smaller graphical icon to which the user can switch by selecting the right arrow. In the context interface 550, summarized information about the context is displayed. In user interface element 557, a location is shown as Beijing. User interface element 559 shows the content of the context. Therefore, in this example, the user may set the content such that it has a textual information "I am driving now." The user may also set a start time 561 and an end time 563 of this context, to set a period of time this context is valid. The user may also set the time such that the context will be valid for an indefinite period of time. User interface element 565 shows the type of activity that the user is involved with, if the user is involved with the activity. The user may be able to choose from a list of pre-defined activities or define the user's activity. In the example shown in FIG. 5C, the user's activity is set to driving. After the user selects "Driving" as the activity, the user can then go to the activity interface 570 as shown in FIG. 5D.

Figure 5D:
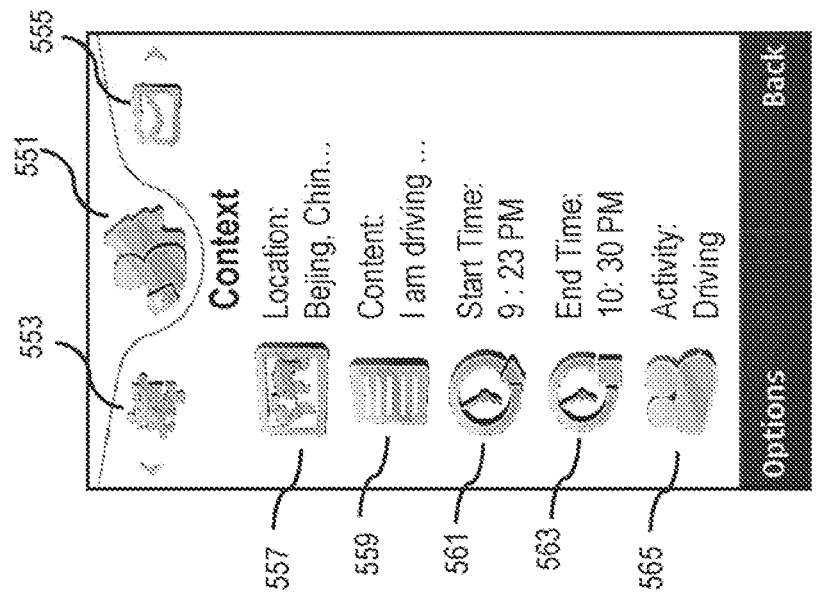

FIG. 5D shows the selected activity (i.e., driving) with an icon representing the activity 571. A default text may appear on the activity content window 573, which may be customizable by the user by selecting the "Edit" option 577. User interface element 575 shows a location window showing detailed location information of the UE 101. The location information may be entered by the user of the UE 101 or may be automatically provided by a location sensor such as the GPS. When the context is ready, then the user can select the "Play" option 579. Once "Play" option 579 is selected, if a caller sends communication within the time specified in the start time 561 and the end time 563, a communication session is established and the information on the location and the content are automatically sent back to the caller in a messaging format, such as text message or MMS or via text-to-speech. Further, a setting may be configured such that the text in the activity content window 573 is sent via text-to-speech while the text in the user interface element 575 is sent in a messaging format.

The processes described herein for performing multiple forms of communication in the same communication session may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
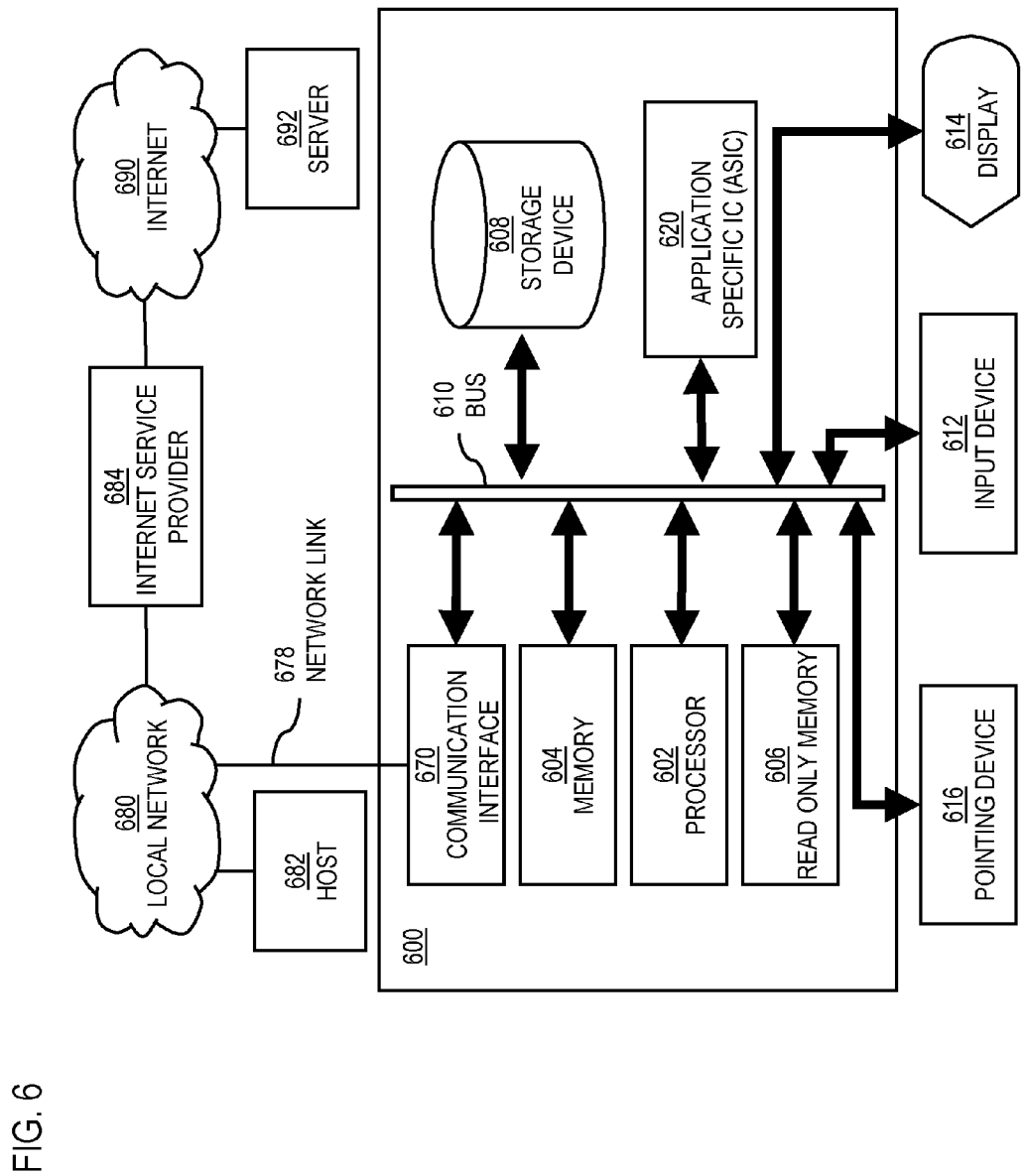
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to perform multiple forms of communication in the same communication session as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of performing multiple forms of communication in the same communication session.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to performing multiple forms of communication in the same communication session. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for performing multiple forms of communication in the same communication session. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for performing multiple forms of communication in the same communication session, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for performing multiple forms of communication in the same communication session.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
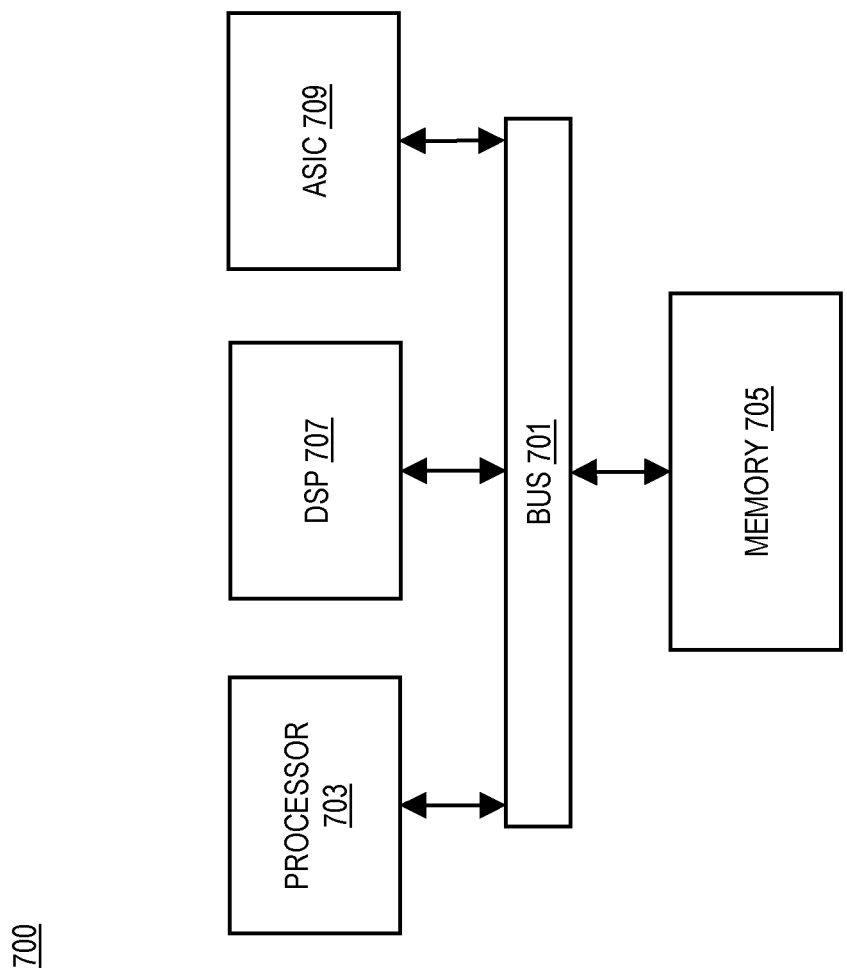
FIG. 7 is a diagram of a chip set that can be used to implement an embodiment of the invention.

FIG. 7 illustrates a chip set 700 upon which an embodiment of the invention may be implemented. Chip set 700 is programmed to perform multiple forms of communication in the same communication session as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of performing multiple forms of communication in the same communication session.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to perform multiple forms of communication in the same communication session. The memory 705 also stores the data associated with or generated by the execution of the inventive steps.

Figure 8:
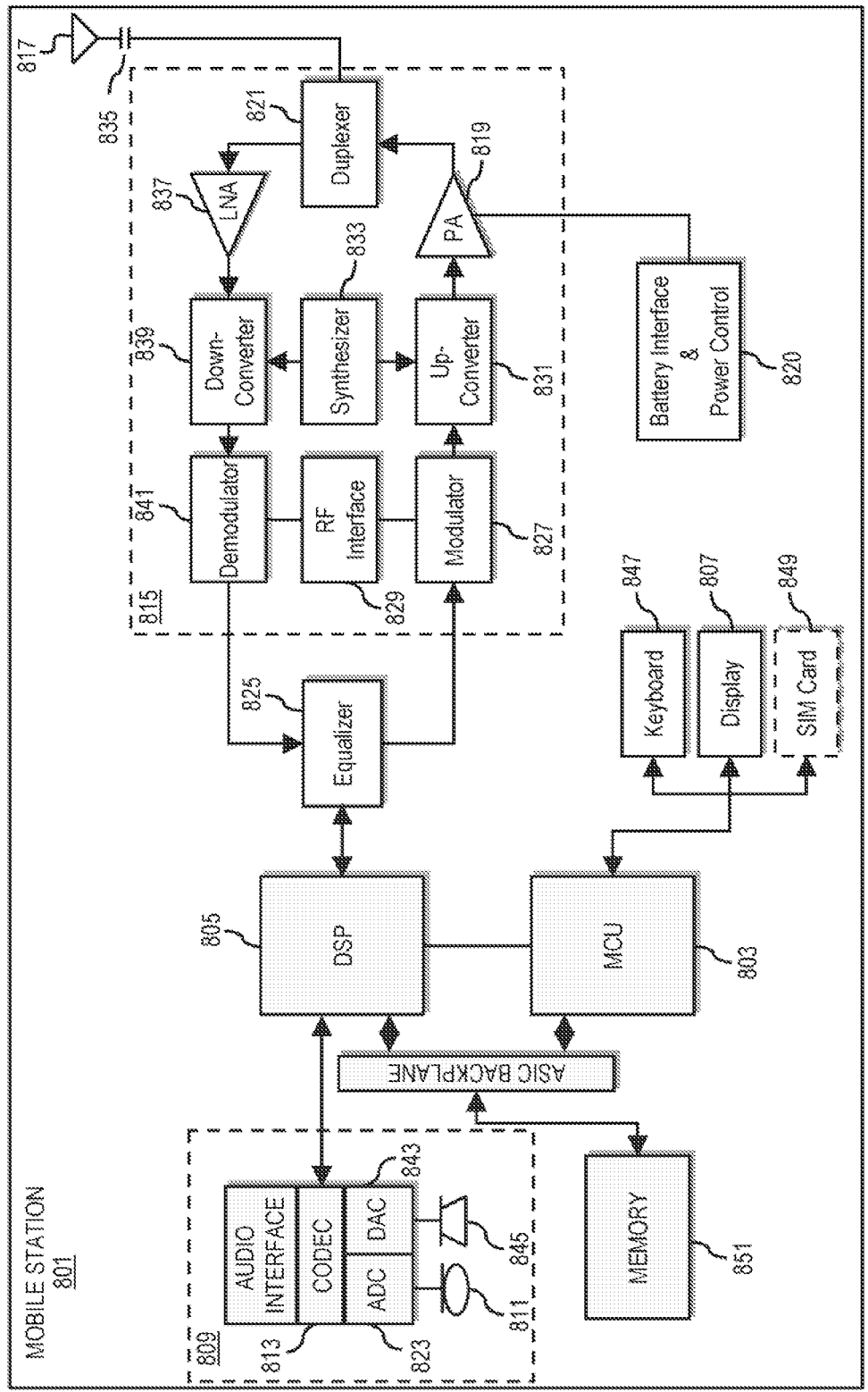
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of performing multiple forms of communication in the same communication session. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(is) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of performing multiple forms of communication in the same communication session. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to perform multiple forms of communication in the same communication session. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request to establish a communication session using a first form of communication, wherein the communication session supports multiple and simultaneous forms of communication;
   determining, by a processor, to select, independent of the first form of communication, a second form of communication to conduct the communication session; and
   transcoding the second form of communication to the first form of communication.

2. A method of claim 1, further comprising:
   transcoding the first form of communication to the second form of communication.

3. A method of claim 1, further comprising:
   receiving an input for selecting the second form of communication,
   wherein the determining to select the second form of communication is based, at least in part, on the input.

4. A method of claim 1, further comprising:
   determining contextual information for the second form of communication to conduct the communication session,
   wherein the determining to select the second form of communication is based, at least in part, on the contextual information, the contextual information including an address of the incoming communication, status, time, location, environment condition, or combination thereof.

5. A method of claim 4, further comprising:
generating one or more communication templates based on the contextual information and the second form of communication;
causing, at least in part, presentation of the communication templates;
receiving an input for selecting or customizing one or more of the communication templates; and
causing, at least in part, transmission of the selected communication templates during the communication session.

6. A method of claim 4, wherein the contextual information is determined from one or more sensors, services, applications, information databases, or a combination thereof.

7. A method of claim 1, further comprising:
switching among the first and second forms of communication during the communication session.

8. A method of claim 1, wherein the multiple and simultaneous forms of communication include voice, text messaging, instant messaging, multimedia messaging, e-mail, video, or a combination thereof.

9. An apparatus comprising:
at least one processor; and
at least one memory including computer program code,
the at least one memory and the computer program code configured to, with the at least one processor, cause the apparatus to perform at least the following,
receive a request to establish a communication session using a first form of communication, wherein the communication session supports multiple and simultaneous forms of communication;
determine to select, independent of the first form of communication, a second form of communication to conduct the communication session; and
transcode the second form of communication to the first form of communication.

10. An apparatus of claim 9, wherein the apparatus is further caused, at least in part, to:
transcode the first form of communication to the second form of communication for presentation.

11. An apparatus of claim 9, wherein the apparatus is further caused, at least in part, to:
cause, at least in part, a display of a user interface; and
receive an input via the user interface for selecting the second form of communication,
wherein the determination to select the second form of communication is based, at least in part, on the input and the user interface displays one or more options that are configured to be dragged and dropped in the user interface.

12. An apparatus of claim 9, wherein the apparatus is further caused, at least in part, to:
determine contextual information for the second form of communication to conduct the communication session,
wherein the determination to select the second form of communication is based, at least in part, on the contextual information, the contextual information including an address of the incoming communication, status, time, location, environment condition, or combination thereof.

13. An apparatus of claim 12, wherein the apparatus is further caused, at least in part, to:
generate one or more communication templates based on the contextual information and the second form communication;
present the communication templates;
receive an input for selecting or customizing one or more of the communication templates; and
perform transmission of the selected communication templates during the communication session.

14. An apparatus of claim 12, wherein the contextual information is determined from one or more sensors, services, applications, information databases, or a combination thereof.

15. An apparatus of claim 9, wherein the apparatus is further caused, at least in part, to:
switch among the first and second forms of communication during the communication session.

16. An apparatus of claim 9, wherein the multiple and simultaneous forms of communication include voice, text messaging, instant messaging, multimedia messaging, e-mail, video, or a combination thereof.

17. An apparatus of claim 9, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

18. A computer-readable non-transitory storage medium carrying one or more sequences of one or more instructions which, when executed by one or more processors, cause an apparatus to at least perform the following steps:
receiving a request to establish a communication session using a first form of communication, wherein the communication session supports multiple and simultaneous forms of communication;
determining to select, independent of the first form of communication, a second form of communication to conduct the communication session; and
transcoding the second form of communication to the first form of communication.

19. A computer-readable non-transitory storage medium of claim 18, wherein the apparatus is caused to further perform:
determining contextual information for the second form of communication to conduct the communication session,
wherein the determining to select the second form of communication is based, at least in part, on the contextual information, the contextual information including an address of the incoming communication, status, time, location, environment condition, or combination thereof.

20. A computer-readable non-transitory storage medium of claim 18, wherein the apparatus is caused to further perform:
generating one or more communication templates based on the contextual information and the second form communication;
causing, at least in part, presentation of the communication templates;
receiving an input for selecting or customizing one or more of the communication templates; and
causing, at least in part, transmission of the selected communication templates during the communication session.

* * * * *